(12) United States Patent
Bonney et al.

(10) Patent No.: US 8,545,320 B2
(45) Date of Patent: Oct. 1, 2013

(54) GAMING MACHINE WITH SURROUND SOUND FEATURES

(75) Inventors: James Bonney, Chicago, IL (US); Eric M. Pryzby, Skokie, IL (US)

(73) Assignee: WMS Gaming Inc., Waukegan, IL (US)

( * ) Notice: Subject to any disclaimer, the term of this patent is extended or adjusted under 35 U.S.C. 154(b) by 630 days.

(21) Appl. No.: 12/822,908

(22) Filed: Jun. 24, 2010

(65) Prior Publication Data

US 2010/0261523 A1    Oct. 14, 2010

Related U.S. Application Data

(60) Division of application No. 11/181,113, filed on Jul. 14, 2005, now Pat. No. 7,766,747, which is a continuation-in-part of application No. 10/345,787, filed on Jan. 16, 2003, now Pat. No. 7,367,886.

(51) Int. Cl.
*A63F 9/24*    (2006.01)

(52) U.S. Cl.
USPC ............... 463/35; 463/16; 463/20; 463/43; 381/99

(58) Field of Classification Search
USPC ............... 463/16–25, 35, 43, 30; 381/1, 2, 381/77, 79–80, 85, 98, 99
See application file for complete search history.

(56) References Cited

U.S. PATENT DOCUMENTS

| | | | |
|---|---|---|---|
| 3,533,629 A | 10/1970 | Raven | 273/138 |
| 3,628,829 A | 12/1971 | Heilig | 297/217.4 |
| 3,831,172 A | 8/1974 | Olliges et al. | 340/384 |
| 4,522,399 A | 6/1985 | Nishikawa | 273/143 R |
| 4,679,143 A | 7/1987 | Hagiwara | 364/411 |
| 4,837,728 A | 6/1989 | Barrie et al. | 364/412 |
| 5,052,685 A | 10/1991 | Lowe et al. | 273/460 |
| 5,082,281 A | 1/1992 | Berghofer | 273/183 |
| 5,133,017 A | 7/1992 | Cain et al. | 381/71 |
| 5,143,055 A | 9/1992 | Eakin | 601/47 |
| 5,199,075 A | 3/1993 | Fosgate | 381/24 |
| 5,259,613 A * | 11/1993 | Marnell, II | 463/42 |
| 5,307,418 A | 4/1994 | Sumitani | 381/307 |
| 5,318,298 A | 6/1994 | Kelly et al. | 273/122 R |

(Continued)

FOREIGN PATENT DOCUMENTS

| | | |
|---|---|---|
| AU | 199943487 A1 | 3/2000 |
| EP | 0081 119 | 6/1983 |

(Continued)

OTHER PUBLICATIONS

Weinert, Joe, "Entertainment Vehicles," International Gaming Wagering Business, pp. 11-12 and 15-18 (Mar. 1997).

(Continued)

*Primary Examiner* — Sunit Pandya
(74) *Attorney, Agent, or Firm* — Nixon Peabody LLP (57) ABSTRACT

A gaming machine for conducting a wagering game includes selective application of surround sound. The selective application of surround sound allows certain key gaming events to be emphasized over other gaming events. The surround sound may be varied to produce certain effects, such as a tactile effect and a gradual building up of suspense and anticipation that increases player excitement and enjoyment. A surround sound decoder may be added in some embodiments to convert monophonic and stereo wagering games into surround sound. The surround sound may be implemented as true surround sound or as virtual surround sound.

25 Claims, 9 Drawing Sheets

(56) References Cited

U.S. PATENT DOCUMENTS

| | | | | |
|---|---|---|---|---|
| 5,370,399 | A | 12/1994 | Liverance | 273/434 |
| 5,411,258 | A | 5/1995 | Wilson et al. | 273/183 |
| 5,444,786 | A | 8/1995 | Raviv | 381/71 |
| 5,450,494 | A | 9/1995 | Okubo et al. | 381/57 |
| 5,469,510 | A | 11/1995 | Blind et al. | 381/55 |
| 5,524,888 | A | 6/1996 | Heidel | 463/22 |
| 5,533,727 | A | 7/1996 | DeMar | 463/23 |
| 5,542,669 | A | 8/1996 | Charron et al. | 463/13 |
| 5,547,192 | A | 8/1996 | Ishibashi | 463/26 |
| 5,580,309 | A | 12/1996 | Piechowiak et al. | 463/16 |
| 5,594,800 | A | 1/1997 | Gerzon | 381/20 |
| 5,633,993 | A | 5/1997 | Redmann et al. | 395/119 |
| 5,655,961 | A | 8/1997 | Acres et al. | 463/27 |
| 5,666,426 | A | 9/1997 | Helms | 381/57 |
| 5,689,572 | A | 11/1997 | Ohki et al. | 381/71.3 |
| 5,695,188 | A | 12/1997 | Ishibashi | 273/143 R |
| 5,743,798 | A | 4/1998 | Adams et al. | 463/17 |
| 5,762,552 | A | 6/1998 | Vuong et al. | 463/25 |
| 5,775,993 | A | 7/1998 | Frentz et al. | 463/17 |
| 5,807,177 | A | 9/1998 | Takemoto et al. | 463/47 |
| 5,812,674 | A | 9/1998 | Jot et al. | 381/1 |
| 5,816,918 | A | 10/1998 | Kelly et al. | 463/16 |
| 5,828,768 | A | 10/1998 | Eatwell et al. | 381/333 |
| 5,833,538 | A | 11/1998 | Weiss | 463/21 |
| 5,838,808 | A | 11/1998 | Prosser | 381/388 |
| 5,851,148 | A | 12/1998 | Brune et al. | 463/25 |
| 5,876,284 | A | 3/1999 | Acres et al. | 463/25 |
| 5,941,773 | A | 8/1999 | Harlick | 463/26 |
| 5,951,015 | A | 9/1999 | Smith et al. | 273/358 |
| 5,971,271 | A | 10/1999 | Wynn et al. | 235/380 |
| 5,971,850 | A | 10/1999 | Liverance | 463/23 |
| 5,995,631 | A | 11/1999 | Kamada et al. | 381/1 |
| 6,056,640 | A | 5/2000 | Schaaij | 463/4 |
| 6,068,552 | A | 5/2000 | Walker et al. | 463/21 |
| 6,075,868 | A | 6/2000 | Goldfarb et al. | 381/301 |
| 6,088,461 | A | 7/2000 | Lin et al. | 381/104 |
| 6,089,663 | A | 7/2000 | Hill | 297/258.1 |
| 6,092,867 | A | 7/2000 | Miller | 297/188.14 |
| 6,110,041 | A | 8/2000 | Walker et al. | 463/20 |
| 6,146,273 | A | 11/2000 | Olsen | 463/27 |
| 6,162,121 | A | 12/2000 | Morro et al. | 463/16 |
| 6,217,448 | B1 | 4/2001 | Olsen | 463/25 |
| 6,239,810 | B1 | 5/2001 | Van Hook et al. | 345/431 |
| 6,254,483 | B1 | 7/2001 | Acres | 463/26 |
| 6,302,790 | B1 | 10/2001 | Brossard | 463/20 |
| 6,308,953 | B1 | 10/2001 | Nagano | 273/143 R |
| 6,315,666 | B1 | 11/2001 | Mastera et al. | 463/31 |
| 6,319,125 | B1 | 11/2001 | Acres | 463/25 |
| 6,347,999 | B1 | 2/2002 | Yuan | 463/46 |
| 6,354,044 | B1 | 3/2002 | Lagace, Jr. | 52/79.5 |
| 6,354,943 | B1 | 3/2002 | Miura | 463/29 |
| 6,368,216 | B1 | 4/2002 | Hedrick et al. | 463/20 |
| 6,416,411 | B1 | 7/2002 | Tsukahara | 463/35 |
| 6,422,941 | B1 | 7/2002 | Thorner et al. | 463/30 |
| 6,471,589 | B1 | 10/2002 | Nagano | 463/21 |
| 6,487,296 | B1 * | 11/2002 | Allen et al. | 381/80 |
| 6,505,772 | B1 | 1/2003 | Mollett et al. | 235/379 |
| 6,508,709 | B1 | 1/2003 | Karmarkar | 463/42 |
| 6,509,896 | B1 | 1/2003 | Ogasawara et al. | 345/419 |
| 6,530,842 | B1 | 3/2003 | Wells et al. | 463/46 |
| 6,537,152 | B2 | 3/2003 | Seelig et al. | 463/30 |
| 6,561,908 | B1 | 5/2003 | Hoke | 463/26 |
| 6,564,108 | B1 | 5/2003 | Makar et al. | 700/17 |
| 6,565,434 | B1 | 5/2003 | Acres | 463/25 |
| 6,575,829 | B2 | 6/2003 | Coleman et al. | 463/20 |
| 6,584,201 | B1 | 6/2003 | Konstantinou et al. | 381/57 |
| 6,587,127 | B1 | 7/2003 | Leeke et al. | 345/765 |
| 6,638,169 | B2 | 10/2003 | Wilder et al. | 463/35 |
| 6,656,046 | B1 | 12/2003 | Yoseloff et al. | 463/20 |
| 6,676,514 | B1 | 1/2004 | Kusuda et al. | 463/24 |
| 6,684,060 | B1 | 1/2004 | Curtin | 455/41 |
| 6,780,103 | B2 | 8/2004 | Bansemer et al. | 463/7 |
| 6,805,633 | B2 | 10/2004 | Hein, Jr. et al. | 463/35 |
| 6,840,860 | B1 | 1/2005 | Okuniewicz | 463/25 |
| 6,843,723 | B2 | 1/2005 | Joshi | 463/25 |
| 6,843,725 | B2 | 1/2005 | Nelson | 463/40 |
| 6,848,219 | B2 | 2/2005 | Standard et al. | 52/6 |
| 6,848,996 | B2 | 2/2005 | Hecht et al. | 463/35 |
| 6,866,581 | B2 | 3/2005 | Martinek et al. | 463/16 |
| 6,875,110 | B1 | 4/2005 | Crumby | 463/42 |
| 6,928,413 | B1 | 8/2005 | Pulitzer | 705/14 |
| 6,935,946 | B2 | 8/2005 | Yoseloff et al. | 463/16 |
| 6,935,955 | B1 | 8/2005 | Kaminkow et al. | 463/35 |
| 6,941,376 | B2 | 9/2005 | Mitchell et al. | 709/229 |
| 6,942,574 | B1 | 9/2005 | LeMay et al. | 463/41 |
| 6,968,063 | B2 | 11/2005 | Boyd | 381/57 |
| 7,364,508 | B2 | 4/2008 | Loose et al. | 463/30 |
| 2001/0004607 | A1 | 6/2001 | Olsen | 463/26 |
| 2002/0037763 | A1 | 3/2002 | Idaka | 463/16 |
| 2002/0039919 | A1 | 4/2002 | Joshi et al. | 463/20 |
| 2002/0052230 | A1 | 5/2002 | Martinek et al. | 463/10 |
| 2002/0077170 | A1 | 6/2002 | Johnson et al. | 463/16 |
| 2002/0090990 | A1 | 7/2002 | Joshi et al. | 463/20 |
| 2002/0142825 | A1 | 10/2002 | Lark et al. | 463/16 |
| 2002/0142846 | A1 | 10/2002 | Paulsen | 463/43 |
| 2002/0151349 | A1 | 10/2002 | Joshi | 463/20 |
| 2002/0160826 | A1 | 10/2002 | Gomez et al. | 463/16 |
| 2003/0054881 | A1 | 3/2003 | Hedrick et al. | 463/29 |
| 2003/0064771 | A1 | 4/2003 | Morrow et al. | 463/16 |
| 2003/0064808 | A1 | 4/2003 | Hecht et al. | 463/42 |
| 2003/0073489 | A1 | 4/2003 | Hecht et al. | 463/35 |
| 2003/0073490 | A1 | 4/2003 | Hecht et al. | 463/35 |
| 2003/0073491 | A1 | 4/2003 | Hecht et al. | 463/35 |
| 2003/0100359 | A1 | 5/2003 | Loose et al. | 463/20 |
| 2003/0114214 | A1 | 6/2003 | Barahona et al. | 463/20 |
| 2003/0211881 | A1 | 11/2003 | Walker et al. | 463/20 |
| 2003/0220139 | A1 | 11/2003 | Peterson | 463/30 |
| 2003/0228902 | A1 | 12/2003 | Walker et al. | 463/25 |
| 2004/0029637 | A1 | 2/2004 | Hein, Jr. et al. | 463/35 |
| 2004/0053695 | A1 | 3/2004 | Mattice et al. | 463/42 |
| 2004/0072610 | A1 | 4/2004 | White et al. | 463/25 |
| 2004/0082388 | A1 | 4/2004 | Simsek et al. | 463/43 |
| 2004/0136553 | A1 | 7/2004 | Lee et al. | 381/307 |
| 2004/0138889 | A1 | 7/2004 | Gilboy et al. | 704/270 |
| 2004/0142739 | A1 | 7/2004 | Loose et al. | 463/20 |
| 2004/0142747 | A1 | 7/2004 | Pryzby | 463/35 |
| 2004/0142748 | A1 | 7/2004 | Loose et al. | 463/35 |
| 2004/0147316 | A1 | 7/2004 | Nagano | 463/35 |
| 2004/0161115 | A1 | 8/2004 | Loose | 381/20 |
| 2005/0043090 | A1 | 2/2005 | Pryzby et al. | 463/35 |
| 2005/0277469 | A1 | 12/2005 | Pryzby et al. | 463/35 |
| 2005/0282631 | A1 | 12/2005 | Bonney et al. | 463/35 |
| 2006/0014586 | A1 | 1/2006 | Gatto et al. | 463/46 |
| 2006/0068909 | A1 | 3/2006 | Pryzby et al. | 463/35 |
| 2006/0116187 | A1 | 6/2006 | Johnson et al. | 463/16 |
| 2006/0281543 | A1 | 12/2006 | Suttin et al. | 463/29 |
| 2006/0281548 | A1 | 12/2006 | Manz | 463/35 |

FOREIGN PATENT DOCUMENTS

| | | |
|---|---|---|
| EP | 0977 856 | 12/1998 |
| EP | 0981 119 | 2/2000 |
| GB | 2124048 | 2/1982 |
| JP | 3-297483 A2 | 12/1991 |
| JP | 5-31254 | 2/1993 |
| JP | 7-289730 A2 | 11/1995 |
| JP | 8-266724 | 10/1996 |
| JP | 9-299551 A2 | 11/1997 |
| JP | 10-277213 | 10/1998 |
| JP | 2001-000641 | 1/2001 |
| JP | 2001-000728 | 1/2001 |
| JP | 2002-177452 | 6/2002 |
| JP | 2002-263250 | 9/2002 |
| JP | 2002-272903 | 9/2002 |
| JP | 2003-919 | 1/2003 |
| JP | 2003-88614 | 3/2003 |
| JP | 2003-88615 | 3/2003 |
| JP | 2003-220271 | 8/2003 |
| JP | 2003-250981 | 9/2003 |
| JP | 2003-250982 | 9/2003 |
| JP | 2003-310872 | 11/2003 |
| WO | WO 01/05477 | 1/2001 |
| WO | WO 00/17825 | 3/2001 |
| WO | WO 01/33905 | 5/2001 |
| WO | WO 02/24288 | 3/2002 |

| | | |
|---|---|---|
| WO | WO 02/40921 | 5/2002 |
| WO | WO 2005/026883 | 3/2005 |
| WO | WO 2005/027059 | 3/2005 |

OTHER PUBLICATIONS

European Search Report for European Patent Application No. EP 04 00 0865, dated Oct. 6, 2004 (3 pages).
Spotlight, Flip Flop Anchor Gaming. "00 Games (Jun. 2000).
Star Wars Video Slots, "03 Games (Sep. 2003).
European Search Report for European Patent Application No. EP 04 00 0730, dated Oct. 11, 2004 (5 pages).
European Search Report for European Patent Application No. EP 04 00 3314, dated Oct. 13, 2004 (3 pages).
European Search Report for European Patent Application No. EP 04 00 0731, dated Oct. 14, 2004 (3 pages).
User's Guide for SB16 PCI Sound Card, copyright 1999 Creative Technology Ltd, Version 2.0 Mar. 2000, 19 pages.
"WAV" Wikipedia: the Free Encyclopedia, accessed Aug. 3, 2007, http://en.wikipedia.org/wiki/WAV, 4 pages.
Wilson, Tracey V; "How Sound Cards Work", How Stuff Works, first accessed Jul. 25, 2007, http://computer.howstuffworks.com/sound-card.htm, 7 pages.
McGuire, Thomas, "Creative Sound Blaster Extigy review," dated Jul. 9, 2002, accessed Feb. 2, 2007, 8 pages, http://www.techspot.com/reviews/hardware/extigy/, 7 pages.
European Search Report for European Patent Application No. EP 04 00 0731.2-1238, Jul. 3, 2008.

* cited by examiner

GAMING MACHINE WITH SURROUND SOUND FEATURES

CROSS-REFERENCE TO RELATED APPLICATION

This application is a divisional of U.S. patent application Ser. No. 11/181,113, titled "Gaming Machine With Surround Sound Features" and filed on Jul. 14, 2005, now allowed, which is a continuation-in-part of U.S. patent application Ser. No. 10/345,787, titled "Gaming System With Surround Sound," filed on Jan. 16, 2003, now issued as U.S. Pat. No. 7,367,886 B2 and each of which is incorporated herein by reference in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to the use of surround sound in gaming machines and, more particularly, to a method and system of selectively applying surround sound to enhance the game play experience.

BACKGROUND OF THE INVENTION

Electronic gaming machines, such as mechanical reel slot machines, video slot machines, video poker machines, video bingo machines, video keno machines, and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or perceived to be the same), players are most likely to be attracted to the most entertaining and exciting of the machines. Shrewd operators consequently strive to employ the most entertaining and exciting machines available because such machines attract frequent play and hence increase profitability to the operator.

To enhance a player's entertainment experience, electronic gaming machines often include special features such as enhanced payoffs, a "secondary" or "bonus" game which may be played in conjunction with a "basic" game, and attractive audio and/or visual effects accompanying the basic and bonus games. The bonus game may comprise any type of game, either similar to or completely different from the basic game, which is entered upon the occurrence of a selected event or outcome of the basic game. Generally, the bonus game provides a greater expectation of winning than the basic game. Further, attractive audio and/or visual effects accompany the basic and bonus games.

Because electronic gaming machines are an important source of income for the gaming industry, operators continually search for new gaming strategies and features to distinguish their electronic gaming machines from competitors in the industry and to provide additional incentives for players to play longer and to return to the casino on their next trip.

Accordingly, there is a continuing need for manufacturers to provide new techniques for enhancing the entertainment experience involved in the play of electronic gaming machines. The present invention is directed to satisfying this need.

SUMMARY OF THE INVENTION

The present invention is directed to a method and system for selectively applying surround sound in a gaming machine. The selective application of surround sound allows certain key gaming events to be emphasized over other gaming events. The surround sound may be varied to produce certain effects, such as a tactile effect and a gradual building up of suspense and anticipation that increases player excitement and enjoyment. A surround sound decoder may be added in some embodiments to convert monophonic and stereo wagering games into surround sound. The surround sound may be implemented as true surround sound or as virtual surround sound.

According to one aspect of the invention, a gaming machine comprises a game display operable to display a symbol combination representing an outcome of a wagering game, the outcome being randomly selected from a plurality of outcomes. The gaming machine further comprises an audio system operable to produce gaming sounds during the game play of the wagering game. The gaming sounds correspond to gaming events in the wagering game, including one or more special gaming events. The audio system is configured to produce in surround sound only the gaming sounds that correspond to the one or more special gaming events.

According to another aspect of the invention, a method of operating a gaming machine comprises the steps of receiving a wager in the gaming machine and displaying a symbol combination representing an outcome of a wagering game in response to receiving the wager. The outcome of the wagering game is randomly selected from a plurality of outcomes. The method further comprises the step of selectively producing surround sound in response to certain ones of the plurality of outcomes being randomly selected during the game play of the wagering game.

According to yet another aspect of the invention, a gaming machine comprises a game display operable to display a symbol combination representing an outcome of a wagering game, the outcome being randomly selected from a plurality of outcomes. The gaming machine further comprises an audio system operable to produce gaming sounds during the wagering game. The wagering game has a theme and the audio system is configured to produce, in surround sound, theme-related sounds that provide a realistic ambience based on the theme of the wagering game.

According to still another aspect of the invention, a gaming machine comprises a game display operable to display a symbol combination representing an outcome of a wagering game, the outcome being randomly selected from a plurality of outcomes. The gaming machine further comprises an audio system operable to produce gaming sounds during the wagering game. A surround sound decoder is connected to the audio system for converting gaming sounds having a non-surround sound format into a surround sound format.

Additional aspects of the invention will be apparent to those of ordinary skill in the art in view of the detailed description of various embodiments, which is made with reference to the drawings, a brief description of which is provided below.

DETAILED DESCRIPTION

Figure 1:
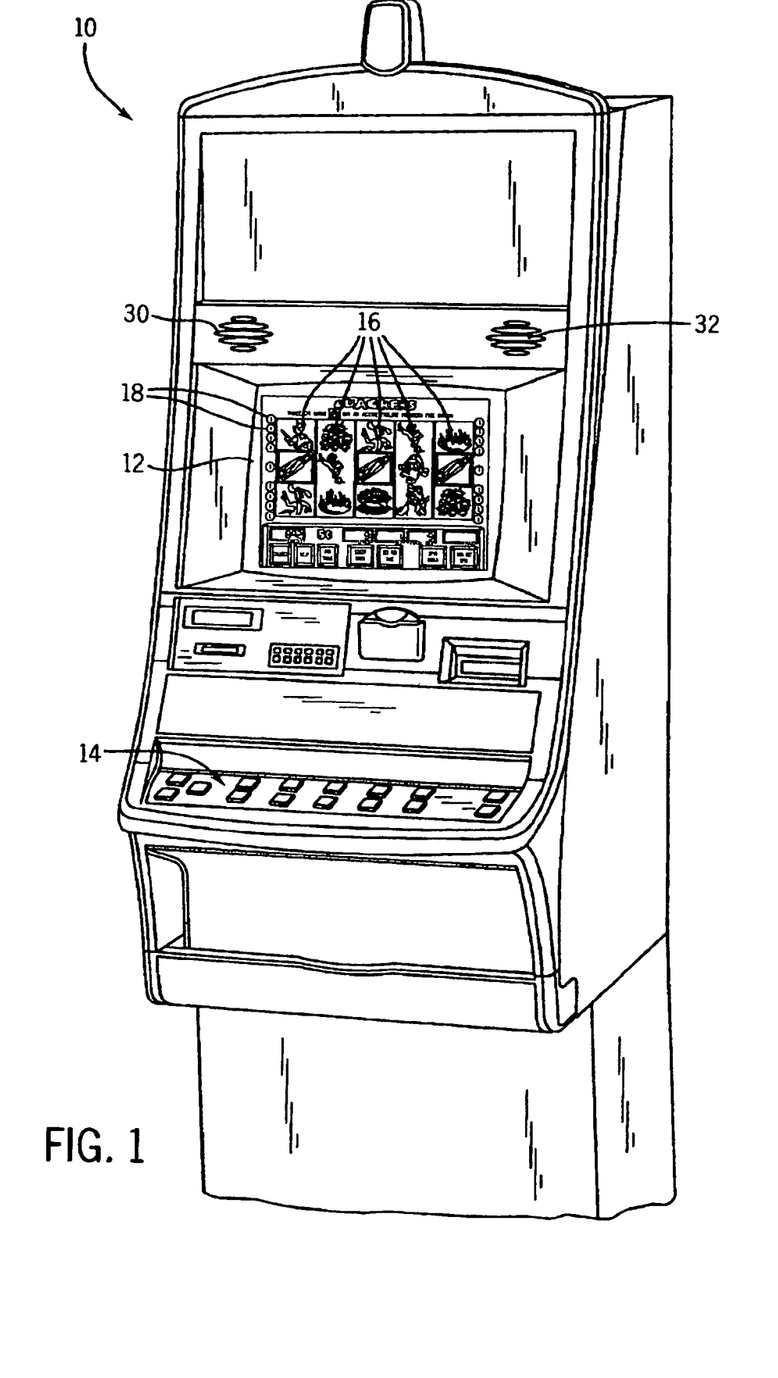
FIG. 1 is an isometric view of a gaming machine for conducting a wagering game.

Turning now to the drawings, FIG. 1 depicts a gaming machine 10 operable to conduct a wagering game such as slots, poker, keno, bingo, or blackjack. Generally, the gaming machine 10 receives a wager from a player to purchase a play of the game. In response, the gaming machine 10 generates at least one random event using a random number generator (RNG) and provides an award to the player for a winning outcome of the random event. Alternatively, the gaming machine 10 may be linked to a remote host computer that generates the random event and transmits the event's outcome to the gaming machine 10. To portray the outcome to the player, the gaming machine 10 includes a video display 12 as shown or a mechanical display. The video display 12 may be implemented with a CRT, LCD, plasma, or other type of video display known in the art. To allow the player to place wagers, make game selections, and otherwise operate the gaming machine 10, the gaming machine 10 includes a physical button panel 14 or a touch screen over the video display 12.

Figure 2A:
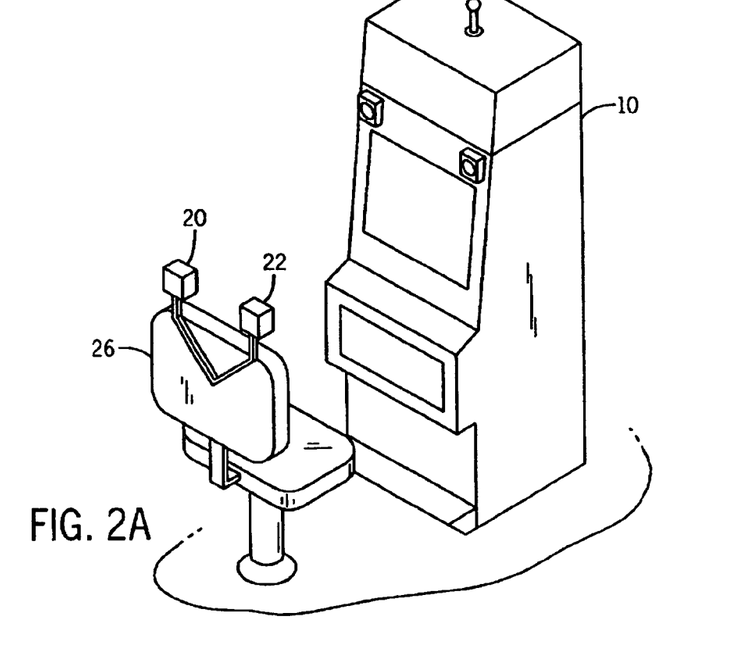
FIG. 2A is an isometric view of a gaming machine with a speaker arrangement according to one embodiment of the invention.

Operation of the gaming machine 10 is described in greater detail below in the context of a video slot game. The video slot game is implemented on the video display 12 on a number of video simulated spinning reels 16 with a number of pay lines 18. Each of the pay lines 18 extends through one symbol on each of the reels 16. Generally, game play is initiated by inserting money or playing a number of credits, causing the gaming machine's central processing unit/CPU (see FIG. 2) to activate a number of pay lines corresponding to the amount of money or number of credits played. In one embodiment, the player selects the number of pay lines to play by pressing a "Select Lines" touch key on the display 12. The player then chooses the number of coins or credits to bet on the selected pay lines by pressing a "Bet Per Line" touch key.

After activation of the pay lines, the reels 16 may be set in motion by pressing a "Spin Reels" touch key or, if the player wishes to bet the maximum amount per line, by using a "Max Bet Spin" touch key on the display 12. Alternatively, other mechanisms such as a lever or push button may be used to set the reels in motion. The CPU uses a random number generator to select a game outcome (e.g., "basic" game outcome) corresponding to a particular set of reel "stop positions." The CPU then causes each of the video reels 16 to stop at the appropriate stop position. Video symbols are displayed on the reels 16 to graphically illustrate the reel stop positions and indicate whether the stop positions of the reels represent a winning game outcome.

Winning basic game outcomes (e.g., symbol combinations resulting in payment of coins or credits) are identifiable to the player by a pay table. In one embodiment, the pay table is affixed to the gaming machine 10 and/or displayed by the display 12 in response to a command by the player (e.g., by pressing a "Pay Table" touch key). A winning basic game outcome occurs when the symbols appearing on the reels 16 along an active pay line correspond to one of the winning combinations on the pay table. A winning combination, for example, could be three or more matching symbols along an active pay line, where the award is greater as the number of matching symbols along the active pay line increases. If the displayed symbols stop in a winning combination, the game credits the player an amount corresponding to the award in the pay table for that combination multiplied by the amount of credits bet on the winning pay line. The player may collect the amount of accumulated credits by pressing a "Collect" touch key. In one implementation, the winning combinations start from the first reel (left to right) and span adjacent reels. In an alternative implementation, the winning combinations start from either the first reel (left to right) or the fifth reel (right to left) and span adjacent reels.

Included among the plurality of basic game outcomes may be one or more start-feature outcomes for triggering play of special features. A start-feature outcome may be defined in any number of ways. For example, a start-feature outcome may occur when a special start-feature symbol or a special combination of symbols appears on one or more of the reels 16. The start-feature outcome may require the combination of symbols to appear along an active pay line, or may alternatively require that the combination of symbols appear anywhere on the display 12 regardless of whether the symbols are along an active pay line. The appearance of a start-feature outcome causes the CPU to shift operation from the video slot game to the special feature associated with that outcome.

In accordance with the present invention, the gaming machine 10 includes a speaker arrangement for emitting multi-channel audio associated with the wagering game in surround sound relative to a player in front of the gaming machine 10. Surround sound refers to the use of sound to envelop the player, making the player feel like he or she is in the middle of the action. The multi-channel audio allows the player to hear sounds coming from all around the player, thus enhancing the player's enjoyment and causing the player to become captivated in the gaming experience. The speaker arrangement for emitting the audio in surround sound includes both a "front" speaker arrangement and a "surround sound" speaker arrangement. Any speaker of the speaker arrangement may be linked to the gaming machine's CPU by speaker wire or a wireless connection.

There are several embodiments of the front speaker arrangement. In one embodiment shown in FIG. 1, the front speaker arrangement includes a left speaker 30 and a right speaker 32 mounted within a cabinet of the gaming machine 10. In an alternative embodiment, the front speaker arrangement includes a single center speaker. In another alternative embodiment, the front speaker arrangement includes a left speaker, a right speaker, and a center speaker.

Figure 2B:
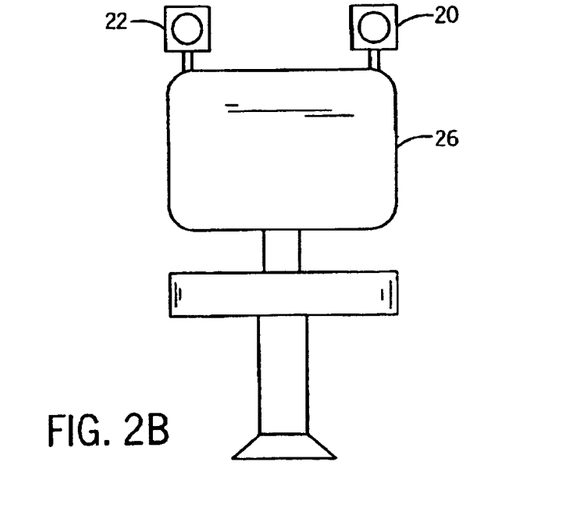
FIG. 2B is a front view of a chair and surround sound speakers shown in FIG. 2A.
Figure 3:
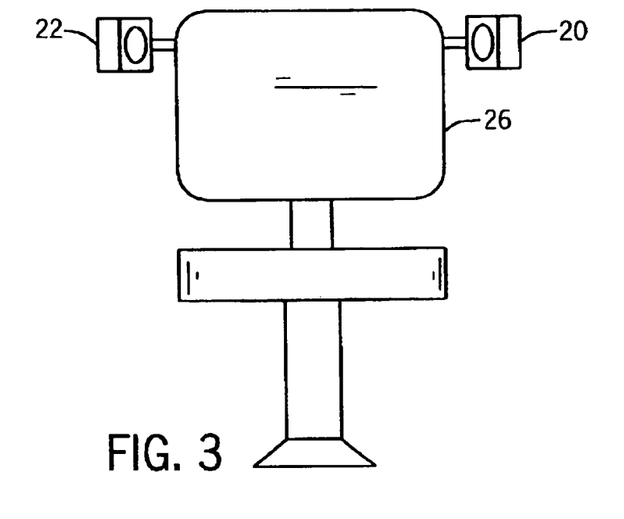
FIG. 3 is a front view of a chair and surround sound speakers according to another embodiment of the invention.
Figure 4:
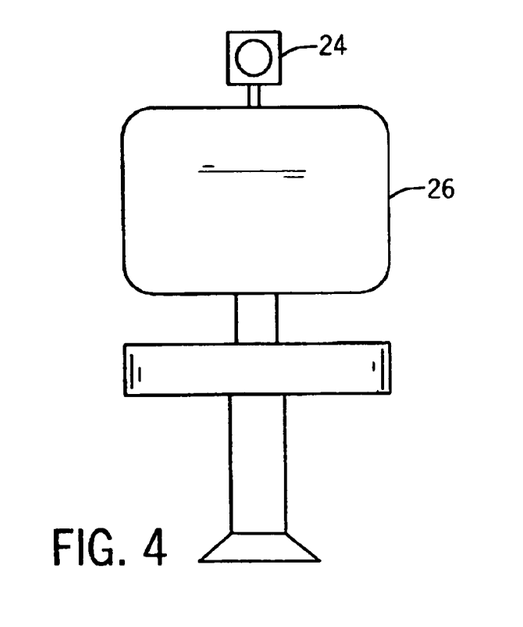
FIG. 4 is a front view of a chair and a surround sound speaker according to yet another embodiment of the invention.

There are also several embodiments of the surround sound speaker arrangement. In one embodiment, shown in FIGS. 2A and 2B, the surround sound speaker arrangement includes a rear left speaker 20 and a rear right speaker 22 generally behind the player. A rear center speaker (see FIG. 4 for placement) is optional. The rear left and rear right speakers 20 and 22 are mounted to a chair 26 on which the player can sit. In an alternative embodiment shown in FIG. 3, the rear left and rear right speakers 20 and 22 are positioned generally on opposite sides of the player and remote from the gaming machine. In an alternative embodiment shown in FIG. 4, the speaker arrangement includes only a rear center speaker 24 generally behind the player.

Figure 5:
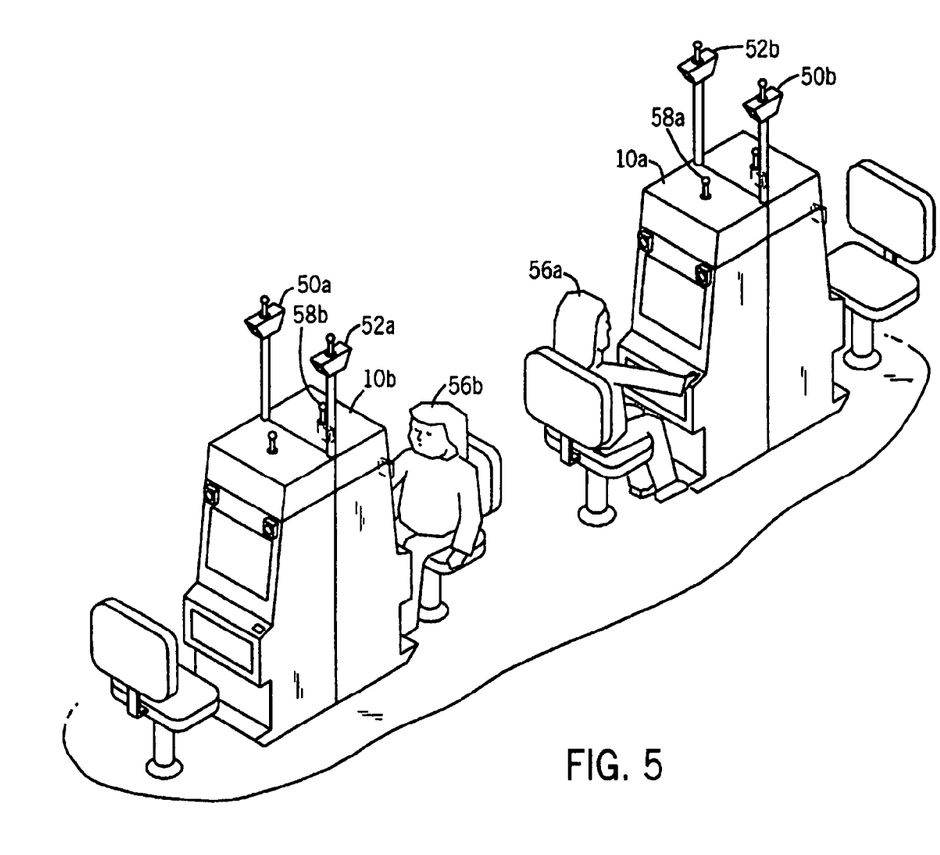
FIG. 5 is an isometric view of gaming machines and a speaker arrangement according to a further embodiment of the invention.
Figure 6:
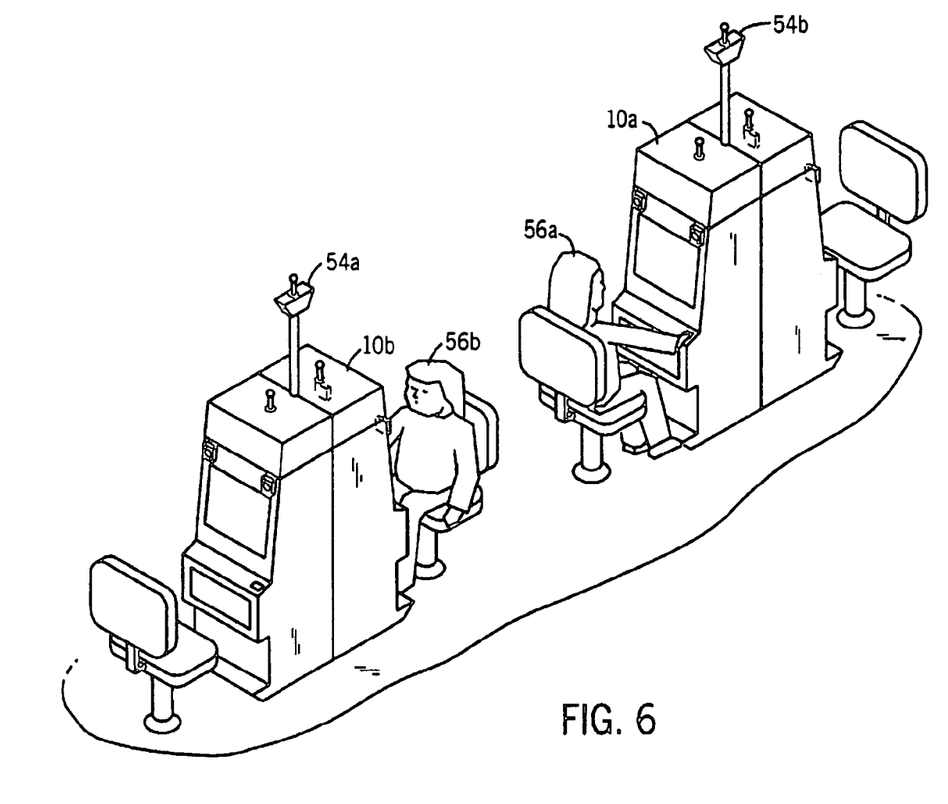
FIG. 6 is an isometric view of gaming machines and a speaker arrangement according to still another embodiment of the invention.

In another embodiment, shown in FIG. 5, the surround sound speaker arrangement includes a rear left speaker 50a, a rear right speaker 52a, and an optional rear center speaker (see FIG. 6 for placement) generally behind the player 56a at the gaming machine 10a. The rear left and rear right speakers 50a and 52a are mounted above a second gaming machine 10b positioned across an aisle from the gaming machine 10a used by the player 56a and are "aimed" toward the player 56a to provide that player with surround sound. In a reciprocal manner, speakers 50b and 52b (and an optional rear center speaker) are mounted above the gaming machine 10a and aimed toward a player 56b to provide that player with surround sound. If the speakers are wireless, the gaming machines 10a and 10b may be outfitted with respective wireless transmitters 58a and 58b for communicating audio signals to the speakers above the opposing gaming machine. In an alternative embodiment shown in FIG. 6, the speaker arrangement includes only a rear center speaker 54a generally behind the player 56a at the gaming machine 10a and a rear center speaker 54b generally behind the player 56b at the gaming machine 10b.

Figure 7:
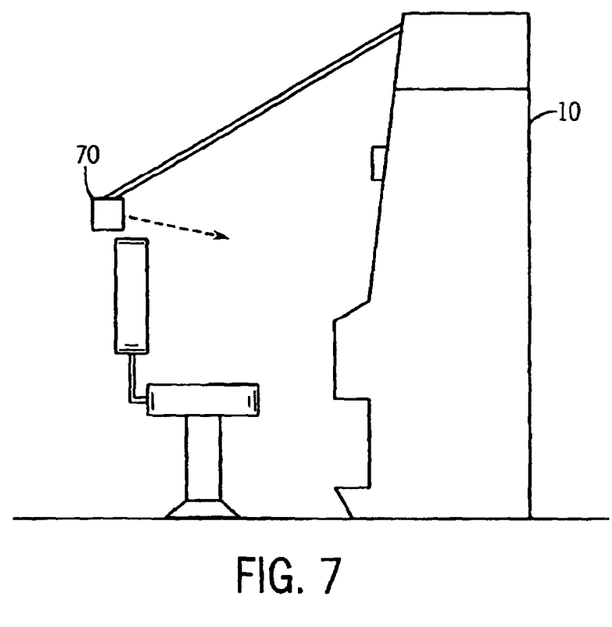
FIG. 7 is a side view of a gaming machine and a speaker arrangement according to yet another embodiment of the invention.

In yet another embodiment, shown in FIG. 7, the surround sound speaker arrangement includes a rear left and right speakers 70 and an optional rear center speaker (not shown). The speakers 70 are mounted to the cabinet of the gaming machine 10 and extend from the cabinet to a position behind or to one side of the player.

Figure 8:
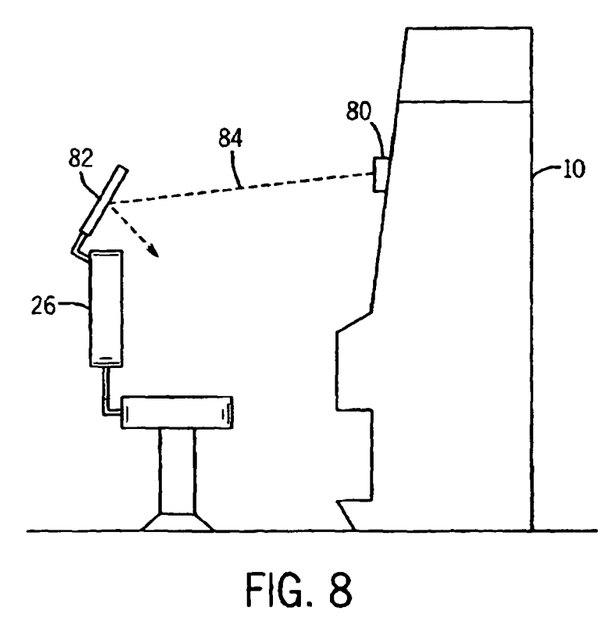
FIG. 8 is a side view of a gaming machine and a speaker arrangement according to still a further embodiment of the invention.
Figure 9:
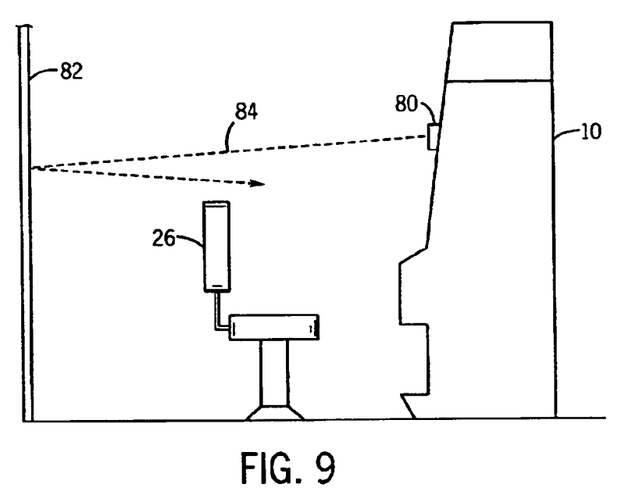
FIG. 9 is a side view of a gaming machine and a speaker arrangement according to still another embodiment of the invention.

In yet another embodiment, shown in FIGS. 8 and 9, the surround sound speaker arrangement includes one or more front speakers 80 (in addition to front speakers 30 and 32 in FIG. 1) and a remote reflective surface 82 behind or to the sides of the player. The reflective surface 82 may, for example, be mounted to the chair 26 as in FIG. 8 or to a structure behind the chair 26 as in FIG. 9. The speakers 80 aim concentrated sound beams 84 at the reflective surface 82. The player hears the reflected sound and perceives the sound as coming from behind him or her. Further details concerning this "virtual" speaker technology may be obtained from U.S. Pat. No. 6,229,899 to Norris et al., which is incorporated herein by reference in its entirety.

The speakers in the above embodiments generally provide full frequency response (e.g., from 20 Hz to 20,000 Hz). In addition to these speakers, the speaker arrangement may include another speaker, called a subwoofer, dedicated to lower frequency effects (e.g., 20 Hz to 120 Hz). The subwoofer may be placed anywhere near the gaming machine 10, including within the cabinet of the gaming machine 10.

Figure 10:
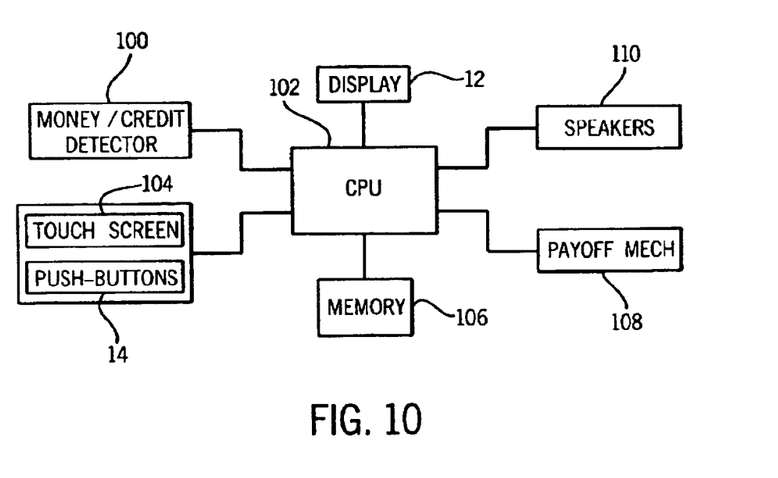
FIG. 10 is a block diagram of a control system suitable for operating a gaming machine according to yet another embodiment of the invention.

FIG. 10 is a block diagram of a control system suitable for operating the gaming machine 10. Money/credit detector 100 signals the CPU 102 when a player has inserted money or played a number of credits. The money may be provided by coins, bills, tickets, coupons, cards, etc. Using a button panel 14 (see FIG. 1) or a touch screen 104, the player may select any variables associated with the wagering game (e.g., number of pay lines and bet per line in a video slot game) and place his/her wager to purchase a play of the game. In a play of the game, the CPU 102 generates at least one random event using a random number generator (RNG) and provides an award to the player for a winning outcome of the random event. The CPU 102 operates the display 12 to represent the random event(s) and outcome(s) in a visual form that can be understood by the player. In addition to the CPU 102, the control system may include one or more additional slave control units for operating additional video and/or mechanical displays.

Memory 106 stores control software, operational instructions and data (or rather the computer-readable versions of such software, instructions and data) associated with the gaming machine. In one embodiment, the memory 106 comprises read-only memory (ROM) and battery-backed random-access memory (RAM). The memory 106 may also include auxiliary memory for storing audio and/or video data. However, it will be appreciated that the memory 106 may be implemented on any of several alternative types of memory structures or may be implemented on a single memory structure. A payoff mechanism 108 is operable in response to instructions from the CPU 102 to award a payoff to the player. The payoff may, for example, be in the form of a number of credits. The number of credits may be determined by one or more math tables stored in the memory 106.

The CPU 102 selects and processes audio data for producing the multi-channel audio to be emitted from speakers 110. The audio data may be stored in the memory 106 in any of various surround sound formats. The CPU 102 includes decoding circuitry and amplification circuitry suitable for the selected format. Alternatively, the decoding circuitry and the amplification circuitry may be located on a dedicated sound CPU board (not expressly shown) linked to the CPU 102. The decoding circuitry and the amplification circuitry may be located outside the gaming machine 10; for example, the amplification circuitry may be located at the speakers 110 or anywhere between the gaming machine 10 and the speakers 110. The speakers 110 are arranged according to the selected format. Examples of digital and analog surround sound formats are discussed below.

DOLBY DIGITAL™ (formerly Dolby AC-3) by Dolby Laboratories, Inc. is a digital surround sound format suitable for the audio data when it is stored in a digital section of the memory 106, such as on a DVD or laserdisc. DOLBY DIGITAL™ provides up to five discrete (independent) channels of full frequency effects (e.g., from 20 Hz to 20,000 Hz), plus an optional sixth channel dedicated to low frequency effects (e.g., from 20 Hz to 120 Hz). The five discrete channels include front center, front left, front right, surround left, and surround right. The center, front-left, and front-right channels generally carry dialogue, music, and sound effects, while the surround left and surround right channels provide surround sound and ambient effects. The sixth channel is usually reserved for a subwoofer speaker for reproducing the low frequency effects that may come with certain wagering games. During production, the audio data is stored in the memory 106 in DOLBY DIGITAL™ format, i.e., as compressed and encoded digital data. The stored digital data is encoded with information indicating the data stream to be transmitted through each sound channel. The CPU 102 includes a digital surround sound decoder that, during playback, decodes the stored digital data into multiple data streams transmitted through the sound channels.

An extended surround version of DOLBY DIGITAL™, called DOLBY DIGITAL EX™ or SURROUND EX™, encodes the audio data with a third surround channel (i.e., surround back channel) that can be decoded for playback over a rear center speaker placed behind the player. Using matrix encoding technology, the surround back channel information is encoded into the surround left and right channels during production and later decoded (or derived) from the surround left and right channels during playback. Because of this matrix encoding scheme, the surround back channel is not a true discrete channel. This allows certain audio effects to be presented behind the player, thereby achieving more enveloping and complete 360 degree surround sound.

DTS DIGITAL SURROUND™ by Digital Theatre Systems, Inc. is a competing and alternative digital surround sound format to DOLBY DIGITAL™. Like DOLBY DIGITAL™, DTS DIGITAL SURROUND™ provides up to five discrete channels of full frequency effects, plus an optional sixth channel dedicated to low frequency effects. DTS DIGITAL SURROUND™, however, offers higher data rates, and therefore uses more of the capacity of the memory 106, than DOLBY DIGITALT™.

An extended surround version of DTS DIGITAL SURROUND™, called DTS-ES MATRIX™, encodes the audio data with a third surround channel (i.e., surround back channel) that can be decoded for playback over a rear center speaker placed behind the player. Yet another extended surround version of DTS DIGITAL SURROUND™, called DTS-ES DISCRETE 6.1™, supports a fully discrete surround back channel. That is, the surround back channel has it own data stream and is truly independent from those of the surround left and right channels.

DOLBY PRO-LOGIC™ by Dolby Laboratories, Inc. is an analog surround sound format that encodes four channels of audio information onto two stereo analog channels during production. The encoded two-channel audio data is stored in an analog section of the memory 106, such as on a Hi-Fi VHS tape. The four channels include front center, front left, front right, and mono surround. The front center channel, among other things, "anchors" any dialogue in a wagering game to the image shown on the video display 12. The CPU 102 includes an analog surround sound decoder that, during playback, uses a technique called matrixing to derive the front center channel and surround sound channel from the encoded two-channel audio data stored in the memory 106. The surround channel is limited in bandwidth to frequencies from 100 Hz to 7,000 Hz.

DOLBY SURROUND™ by Dolby Laboratories, Inc. is an analog surround sound format that encodes three channels of audio information onto two stereo analog channels. The three channels include front left, front right, and surround. Relative to DOLBY PRO-LOGIC™, DOLBY SURROUND™ gives up the front center channel along with some degree of fidelity in the surround channel.

Figure 11:
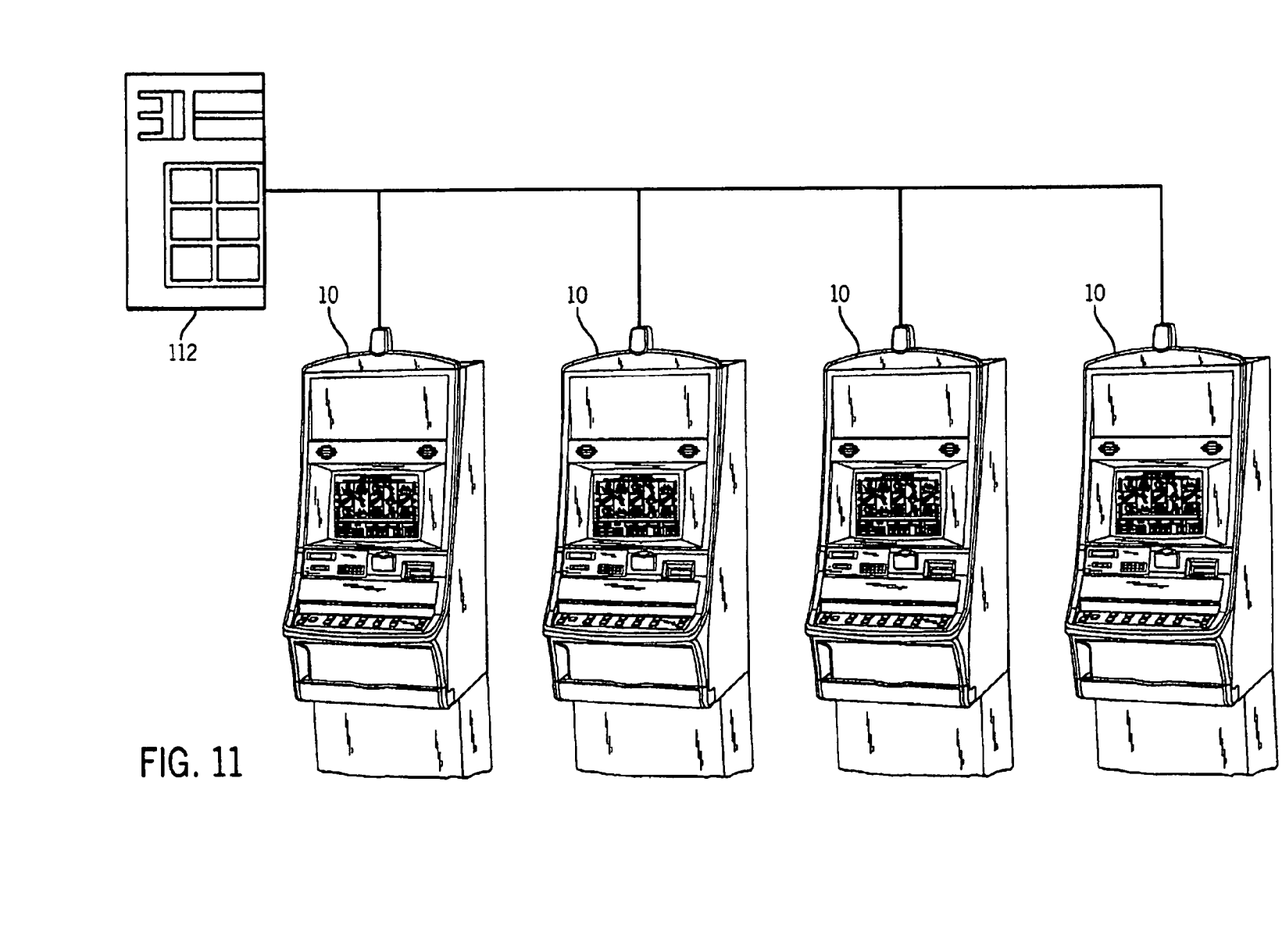
FIG. 11 illustrates a gaming system architecture in which a bank of gaming machines are connected to a host computer.

In the above-described embodiments, the CPU 102 for selecting audio data to be processed and played back is located at the gaming machine 10. In an alternative embodiment shown in FIG. 11, the gaming machine 10 and a plurality of other gaming machines are linked to a remote host computer 112 over a network, such as an Ethernet-based local area network (LAN). The gaming machine 10 may, in turn, select and process audio data and video data from its memory 106 representative of a wagering game outcome. The game outcome may be determined at the host computer 112 or locally at the gaming machine 10. Alternatively, the host computer 112 may transmit audio and/or video content to the gaming machine 10, which in turn receives, processes (e.g., decodes and amplifies), and plays back the received content. The transmitted content may be streamed so that the gaming machine 10 can start playing the content before the entire file has been transmitted. For streaming to work, the gaming machine 10 must be able to collect the content and send it as a steady stream to the application that is processing the data and converting it to sound or images. If the streaming gaming machine 10 receives the content more quickly than required, it saves the excess content in a buffer.

The performance, listening environment, and physical locations of the surround sound speakers may vary in different installations. For example, with respect to the embodiments shown in FIGS. 5 and 6, in one installation the surround sound speakers may be located about seven feet off the ground and about ten feet from the gaming machine 10 for which they are providing surround sound. In another installation the surround sound speakers may be located about eight off the ground and about twelve feet from the gaming machine 10. The variable locations may adversely impact the effectiveness of the speakers' in providing surround sound. Accordingly, to counteract this potential issue and create the optimum acoustical experience for players, the gaming machine 10 may offer operator-selectable, audio configuration options. An operator can access the configuration options and current settings for each option via an onscreen setup menu. The configuration options may, for example, include the following:

SPEAKER BALANCE ADJUSTMENT: This operation uses an internal test-tone generator for balancing the levels of the front and surround sound speakers. The operator performs this adjustment of each speaker output level while situated at a player's typical playing position. To initiate the adjustment process, the operator may press an onscreen "test" key. In response, a hiss-like calibration tone is heard in sequence from the speakers included in the speaker arrangement. In a five speaker arrangement, for example, the calibration tone is heard in sequence from the front left speaker, the front center speaker, the front right speaker, the rear right speaker and the rear left speaker. The state of the calibration tone output is shown in the video display 12 of the gaming machine 10. During the calibration tone sequence, the operator can select any speaker whose output level the operator wishes to adjust and can adjust the level of the selected speaker by pressing onscreen +/− keys. While making an adjustment to a selected speaker, the calibration tone is fixed on the selected speaker.

SURROUND BALANCE CONTROL: Adjusts the left and right output level of the surround sound speakers to compensate for sound imbalance caused by speaker positions or listening environment conditions.

SURROUND SWITCH: Normally on, the operator can turn this switch off to disable output from any surround sound speakers and re-distribute any surround sound signals to the front speakers.

DELAY TIME: The operator can adjust the time difference (i.e., delay time) between the beginning of the sound from the front speakers and the beginning of the effect sound from the surround sound speakers. The larger the value, the later the effect sound is generated. The control range may, for example, be 0 to 50 milliseconds (ms) in 1 ms steps. The operator can adjust the delay time by pressing onscreen "+/−" keys.

SURROUND SOUND SPEAKER SIZE: The operator can define the size of the surround sound speakers to be small or large. The factory preset position is small. In the small position, low bass signals (e.g., below 90 Hz) at the surround sound channels are instead output from a low frequency effects (LFE) channel if the LFE channel exists in the utilized surround sound format. In the large position, full range signals (including low bass signals) are output from the surround sound channels.

SURROUND SPEAKER HEIGHT: The vertical distance of each surround sound speaker off the ground. The setup screen may offer a number of heights (e.g., in feet) from which the operator makes a selection.

SURROUND SPEAKER DISTANCE: The horizontal distance of each surround sound speaker from the gaming machine. The setup screen may offer a number of distances (e.g., in feet) from which the operator makes a selection. Based on the selected surround speaker height and distance, the CPU 102 automatically adjusts the volume level at the surround sound channels.

IMPEDANCE: The operator can set the CPU's amplifier for either 4 or 8-ohm speakers.

MASTER VOLUME: The operator can simultaneously control the output level of all sound channels. In one embodiment, the operator can set the volume to mute (off), low, medium, or high. In another embodiment, the operator can set the volume to anywhere between mute and high.

BASS CONTROL: The operator can adjust the low frequency response for the front sound channels.

BASS EXTENSION CONTROL: When this switch is turned on, the CPU 102 boosts the bass frequency response at the front sound channels while maintaining overall tonal balance.

TREBLE CONTROL: The operator can adjust the high frequency response for the front sound channels.

TONE BYPASS SWITCH: The operator can bypass the bass and treble controls and provides a flat, pure signal. When this switch is turned on, the audio input signal does not pass through the tone control circuitry of the CPU 102 so that it is unaffected by the tone control circuitry.

DYNAMIC RANGE: Dynamic range is the difference between the maximum level and the minimum level of sounds. The operator can set the dynamic range to maximum, standard, or minimum. The factory preset position is maximum. This option is effective only when the audio data is stored in the memory 106 in a digital surround sound format.

LFE LEVEL: The operator can set the LFE level of the LFE channel between −20 dB and 0 dB in 1 dB steps. The factory preset position is 0 dB. This option is effective only when the audio data is stored in the memory 106 in a digital surround sound format and produces LFE signals when decoded by the CPU 102.

SOUND FIELD: The operator can select a digital signal processing (DSP) program to be used by the CPU 102 for processing the audio data retrieved from the memory 106. The DSP programs produce different sound fields that are digital recreations of actual acoustic environments. Examples of sound fields include movie theater, sports, stadium, disco, rock concert, jazz club, church, and concert hall. The sound field may, for example, be selected according to the theme of the wagering game conducted on the gaming machine.

SOUND SCHEME: The operator can set the sound scheme to either a thematic sound scheme or a standard sound scheme. The thematic sound scheme utilizes sounds related to the theme of the wagering game. The standard sound scheme utilizes generic sounds, i.e., sounds unrelated to the theme of the wagering game.

The configuration options allow an operator to configure the gaming machine 10 to optimize the acoustical experience for players. In addition to configuration options that can be changed via a setup menu, the gaming machine provider may define technical parameters regarding recommended placement of gaming machines 10 and surround sound speakers. To the extent the surround sound speakers can "point" in different directions, the technical parameters may also include recommended angles of the surround sound speakers. An installation manual for the gaming machine may define the technical parameters.

In some embodiments, instead of true surround sound that relies on one or more surround sound channels delivering audio signals to a speaker behind or to the side of a player, the present invention also contemplates "virtual" surround sound. Virtual surround sound relies on psychoacoustics effects instead of surrounding speakers to simulate a surround sound environment using only left and right speakers. A variety of virtual surround sound software and/or hardware are available from, for example, Q-Sound Labs, SRS Labs, Spatializer Audio Labs, Creative Technology, Dolby, Sony, Phillips, Soundmatters, and other surround sound technology companies.

Regardless of the specific surround sound implementation (e.g., true surround sound, virtual surround sound, etc.), surround sound can provide a more enjoyable audio experience compared to monophonic and stereo sound. In particular, the 3-dimensional (3-D) effects of surround sound may provide a player with a more realistic-sounding ambience during game play based on the theme of the gaming machine 10. For example, surround sound may be used in a gaming machine 10 having a Hawaiian theme to immerse the player in the sounds of ocean waves. The wave sounds may start on one side of the player, then flow to the other side, simulating the effect of an ocean wave rolling over the player. In another embodiment, surround sound may be used to provide bird calls and animal noises in a gaming machine 10 having an Amazon theme. The bird calls and animal noises may be made to sound as if they are coming randomly from all around the player, simulating the effect of being in a tropical rain forest.

Unfortunately, many existing wagering games were designed for monophonic and stereo sounds only. That is, the audio data files for these wagering games were created/recorded with only one (monophonic) or two (stereo) audio channels. It would be desirable for casino operators to be able to provide these monophonic and stereo wagering games, many of which are very popular, in full surround sound. However, the effort and expense associated with creating new surround sound audio data files and replacing the original audio data files can be prohibitive.

Accordingly, in some embodiments, the gaming machine 10 may be equipped with a surround sound decoder that is capable of converting the monophonic and stereo signals into surround sound signals. Such surround sound decoders are well known to those having ordinary skill in the art and are available from many of the same surround sound technology companies that provide the virtual surround sound algorithms mentioned above. The surround sound decoder may be implemented in either hardware or software (or both), and may be a stand-alone decoder or part of an integrated codec (coder/decoder) that is also capable of converting surround sound signals back into monophonic and stereo signals.

Figure 12:
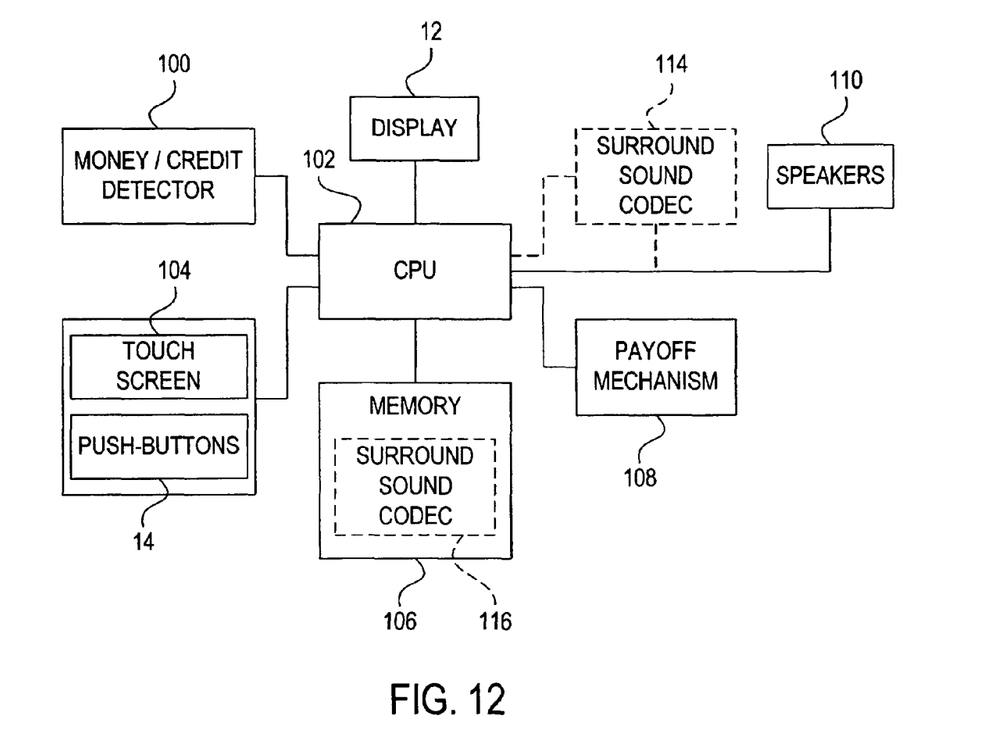
FIG. 12 is a block diagram of another control system suitable for operating a gaming machine according to yet another embodiment of the invention.

FIG. 12 illustrates a block diagram of a control system suitable for operating the gaming machine 10 in which a surround sound codec has been added. The control system of FIG. 12 is essentially identical to the control system of FIG. 10 except that, in one embodiment, an optional surround sound codec 114 has been connected to the CPU 102 and the speakers 110. In operation, the CPU 102, or a dedicated sound CPU board (not expressly shown) connected to the CPU 102, selects the appropriate audio data files to be played from a library of audio data files stored in the memory 106. The CPU 102 may also download the audio data files (e.g., streaming) from the remote host computer 112 as needed (see FIG. 11). The specific selections may be made, for example, using a look-up table to look up the particular audio data files for the gaming events currently occurring in the wagering game. For a monophonic or stereo wagering game, the CPU 102 sends the monophonic and stereo audio data files to the surround sound codec 114 instead of directly to the speakers 110. The surround sound codec 114 converts the monophonic or stereo signals from the CPU 102 into surround sound signals, then routes them to the speakers 110 for playback.

The conversion to surround sound may be configured as needed to suit the particular surround sound configuration of the gaming machine 10. The configuration may require, for example, a specific number of surround sound channels as well as a particular proprietary surround sound format. Different codecs 114 may be needed for different proprietary surround sound formats. In any event, the above arrangement allows casino operators to provide their existing, and possibly more popular, monophonic and stereo wagering games in full surround sound, thus taking advantage of surround sound-capable gaming machines like the gaming machine 10 described herein. As a result, casino operators who have purchased surround sound-capable gaming machines need not alter their existing monophonic and stereo wagering games, or purchase new surround sound wagering games, to be able to use their surround sound gaming machines.

An additional benefit is that, in some embodiments, players may be given the option of turning the surround sound codec 114 off. Such an option may be welcome by players who do not consider the sometimes loud and booming effects of surround sound to be enjoyable. The option may be implemented, for example, via a button on the touch screen 104 that the player may toggle on and off. Selecting this option causes the monophonic and stereo signals to pass through the surround sound codec 114 substantially unaltered, thereby removing the effects of the surround sound.

It should be noted that, although the surround sound codec 114 is shown in FIG. 12 as a hardware codec, the invention is not limited thereto. For example, it is also possible to implement the optional surround sound codec as a software module 116 stored in the memory 106. Such software surround sound codecs are well known to those having ordinary skill in the art and may also be available from many of the surround sound technology companies mentioned previously. The surround sound software module 116 may be executed by the CPU 102 as needed to convert monophonic and stereo audio signals to surround sound signals. As before, the conversion may be adjusted (e.g., number of channels, format, etc.) to suit the particular surround sound configuration of the gaming machine 10. The converted surround sound signals are then provided to the speakers 110 and played back in full surround sound in the manner described above.

The foregoing embodiments provide surround sound in a general sense to give players a more enjoyable and exciting gaming experience. In some embodiments, however, instead of a general application, it is possible to apply surround sound to specific wagering game elements only (i.e., on a selective basis). Such selective application of surround sound has been found to increase a player's ability to recognize and appreciate certain gaming events associated with the surround sound, resulting in an even deeper and richer gaming experience. Following are examples of selective application of surround sound to further enhance the gaming experience.

In some embodiments, surround sound may be used to emphasize or otherwise distinguish key or special gaming events in the wagering game. During the course of game play, the gaming machine 10 usually produces an assortment of gaming sounds, including coins dropping, buttons being pushed, reels spinning, various tones and music, and the like. In accordance with embodiments of the invention, some of these gaming sounds may be produced in stereo while others are produced in full surround sound. The gaming sounds that are produced in surround sound may be associated with certain special gaming events, such as the awarding of a game enhancement symbol (e.g., a wild symbol), a bonus game or basic game feature (e.g., free spins), a winning outcome in the wagering game (e.g., three identical symbols in a row), a progressive jackpot, and other similar events in the wagering game. It is also possible to define the special gaming events as a subset of a set of gaming events, for example, only certain winning outcomes or only certain bonus games, and so forth. Other examples may include the player achieving a certain wagering level, a certain level of winnings, a certain game play eligibility status, and other similar achievements by the player.

Since only certain gaming sounds are produced in surround sound and not others, the player is able to more easily recognize and appreciate the gaming events associated with these sounds. This arrangement has often been observed to generate a heightened sense of anticipation and excitement in the player, thereby resulting in a more enjoyable gaming experience. In addition, players at other gaming machines and/or passersby in the casino may be attracted by the surround sound gaming sounds and may be emboldened in their wagering activities or persuaded to start wagering.

The gaming sounds that are produced in surround sound may assume a variety of forms. For example, they may be generic sounds, such as bells, whistles, trumpets, drum beats, and other similar celebratory sounds, or they may be theme-specific sounds, such as portions of popular songs, music, famous or infamous lines from movies, TV shows, real-life events, and so forth. For example, if the gaming machine 10 has a "TOP GUN" movie theme, upon occurrence of a special gaming event, the gaming machine 10 may play the "TOP GUN" theme song in surround sound. The gaming machine 10 may also play a surround sound version of an F-14 Tomcat taking off or landing, with the engine noise swirling around the player to create a realistic effect. The same gaming sound may be associated with multiple special gaming events, or several gaming sounds may be associated with a single special event, and so forth.

Furthermore, the gaming sounds that are produced in surround sound may be arranged in a certain sequence or pattern, or otherwise orchestrated, to produce a desired effect where the special gaming events are directly or indirectly connected to one another. For example, where the wagering game requires the player to collect a certain number of objects in sequence, each time the player collects one of the objects, the gaming sound that is produced in surround sound may be an incrementally higher (or lower) frequency version of the previous gaming sound. Similarly, the gaming sounds may be produced in surround sound with an incrementally louder (or softer) volume each time the player collects one of the objects. In any case, the effect on the player is often one of suspense and anticipation slowly or quickly increasing until the surround sound gaming sounds eventually culminate in some predetermined audio finale or climax.

In some embodiments, the specific spatialization of the surround sound may be varied based upon the occurrence of certain special gaming events. Spatialization refers to the location in space from which the gaming sounds appear to be coming from relative to the gaming machine 10. Possible spatializations include front-left, front-right, rear-left, rear-right, front-center, rear-center, and various combinations thereof. The gaming sound may also flow from one spatialization to another (e.g., left-to-right, right-to-left, front-to-back, back-to-front, clockwise, counterclockwise, and various combinations thereof). The flow may be a gradual or sudden flow, depending on the particular special gaming events. Thus, for example, in a wagering game where the player has the option of doubling (or tripling, quadrupling, etc.) his or her wager, not selecting the option may result in gaming sounds being played only in front of the player during game play. On the other hand, selecting the doubling option may result in the same gaming sounds being played both in the front and back of the player during game play. It is also possible for the gaming machine 10 or the remote host computer 112 to vary the spatialization independently of any player actions, selections, wagers, and the like, in order to achieve a certain effect.

As mentioned above, the gaming sounds that are produced by the gaming machine 10 may be stored as audio data files in the memory 106 (or downloaded from the remote host computer 112 as needed). In one embodiment, the particular audio data files for the special gaming events may be stored in a surround sound format, while other audio data files are stored in a stereo or monophonic format. All audio data files are then played back using their respective native formats when selected and there is no conversion between formats. In an alternative embodiment, the audio data files for both the special gaming events as well as other gaming events may be stored in the same stereo or monophonic format, then converted to a surround sound format by the hardware or software codecs 114 or 116 (see FIG. 12) as needed. As a result, the selection of which particular gaming sounds are to be played in surround sound for a given wagering game may be changed from time to time as needed by the casino operators. This arrangement advantageously allows the casino operators to more easily alter and/or update the wagering game without having to change out the audio data files.

In addition to an enhanced audio experience, surround sound may also be used to further provide the player with an enhanced tactile experience. For example, one or more surround sound channels may be used to provide audio signals to the subwoofer speakers mentioned previously. The low-frequency sounds from the subwoofers may then be used to vibrate the cabinet of the gaming machine 10 and/or the chair on which the player sits. The intensity and/or duration of the vibrations, as well as their timing, may be selected to coincide with certain special gaming events occurring in the wagering game as needed to achieve a desired effect. For more information regarding the use of the audio signals to provide a tactile experience in a gaming machine, the reader is referred to U.S. Provisional Application No. 60/592,894, entitled "Gaming Machine Chair," filed on Jul. 30, 2004, and incorporated herein by reference in its entirety. The overall impact is an enhanced audio and tactile experience that increases the enjoyment and excitement of the gaming experience for the player.

While the present invention has been described with reference to one or more particular embodiments, those skilled in the art will recognize that many changes may be made thereto without departing from the spirit and scope of the present invention. Accordingly, each of these embodiments and obvious variations thereof is contemplated as falling within the spirit and scope of the claimed invention, which is set forth in the following claims:

What is claimed is:

1. A gaming system comprising:
a first gaming machine having
a first cabinet housing,
a first display mounted to the first cabinet housing for displaying a first wagering game,
first input device for accepting inputs from a first player to play the first wagering game, and
at least one first front speaker and at least one first rear speaker mounted to the first cabinet housing; and
a second gaming machine positioned facing the first gaming machine, the second gaming machine having
a second cabinet housing,
a second display mounted to the second cabinet housing for displaying a second wagering game,
a second input device for accepting inputs from a second player to play the second wagering game, and
at least one second front speaker and at least one second rear speaker mounted to the second cabinet housing;
wherein the at least one first front speaker and the at least one second rear speaker form a first speaker arrangement for emitting first multi-channel audio associated with the first wagering game in surround sound relative to the first player at the first gaming machine, the first multi-channel audio including front audio emitted by the at least one first front speaker and rear audio emitted by the at least one second rear speaker; and
wherein the at least one second front speaker and the at least one first rear speaker form a second speaker arrangement for emitting second multi-channel audio associated with the second wagering game in surround sound relative to the second player at the second gaming machine, the second multi-channel audio including front audio emitted by the at least one second front speaker and rear audio emitted by the at least one first rear speaker.

2. The gaming system of claim 1, wherein the at least one second rear speaker is aimed toward the first player at the first gaming machine to provide that player with a surround sound experience.

3. The gaming system of claim 1, wherein the at least one first front speaker includes a left front speaker and a right front speaker mounted within the first cabinet housing.

4. The gaming system of claim 1, wherein the at least one first front speaker is a single center front speaker mounted within the first cabinet housing.

5. The gaming system of claim 1, wherein the at least one first front speaker includes a left front speaker, a right front speaker, and a center front speaker mounted within the first cabinet housing.

6. The gaming system of claim 1, wherein the at least one first front speaker is mounted within the first cabinet housing above the first display.

7. The gaming system of claim 1, wherein the at least one second rear speaker includes a left rear speaker and a right rear speaker mounted above the second cabinet housing.

8. The gaming system of claim 1, wherein the at least one second rear speaker includes a center rear speaker mounted above the second cabinet housing.

9. The gaming system of claim 1, wherein the at least one second rear speaker includes a left rear speaker, a right rear speaker, and a center rear speaker mounted above the second cabinet housing.

10. The gaming system of claim 1, wherein the at least one second rear speaker is a wireless speaker, each of the first gaming machine and the second gaming machine having a respective wireless transmitter for communicating audio signals to the at least one second rear speaker.

11. A method of conducting wagering games on a gaming system having a first gaming machine and a second gaming machine, the first gaming machine including first front and rear speakers mounted to a first cabinet housing, the second gaming machine including second front and rear speakers mounted to a second cabinet housing, the second gaming machine being positioned facing the first gaming machine, the method comprising:
 receiving a first wager input from a first player to play a first wagering game via the first gaming machine;
 receiving a second wager input from a second player to play a second wagering game via the second gaming machine
 presenting a first randomly selected outcome of the first wagering game on a first display of the first gaming machine;
 presenting a second randomly selected outcome of the second wagering game on a second display of the second gaming machine;
 emitting first multi-channel audio associated with the first wagering game in surround sound relative to the first player at the first gaming machine, the first multi-channel audio including front audio emitted by the first front speaker and rear audio emitted by the second rear speaker; and
 emitting second multi-channel audio associated with the second wagering game in surround sound relative to the second player at the second gaming machine, the second multi-channel audio including front audio emitted by the second front speaker and rear audio emitted by the first rear speaker.

12. The method of claim 11, further comprising communicating audio signals to one or more of the first front and rear speakers and the second front and rear speakers via a wireless transmission.

13. The method of claim 11, wherein the first front speaker is mounted within the first cabinet housing of the first gaming machine.

14. The method of claim 11, wherein the second rear speaker is mounted above the second cabinet housing of the second gaming machine.

15. The method of claim 11, wherein the first front speaker includes one or more of a left front speaker, a right front speaker, and a center front speaker.

16. The method of claim 11, wherein the first rear speaker includes one or more of a left rear speaker, a right rear speaker, and a center rear speaker.

17. The method of claim 11, further comprising converting audio signals from non-surround sound signals to surround sound signals before routing the audio signals to respective ones of the first front and rear speakers and the second front and rear speakers.

18. The method of claim 17, wherein the audio signals include one or more of a monophonic signal and a stereo signal.

19. A gaming system comprising:
 a first gaming machine for playing a first wagering game and having at least one first front speaker and at least one first rear speaker; and
 a second gaming machine for playing a second wagering game and positioned facing the first gaming machine, the second gaming machine having at least one second front speaker and at least one second rear speaker;
 wherein the at least one first front speaker and the at least one second rear speaker form a first speaker arrangement for emitting multi-channel audio associated with the first wagering game in surround sound relative to a first player at the first gaming machine, the multi-channel audio including front audio emitted by the at least one first front speaker and rear audio emitted by the at least one second rear speaker; and
 wherein the at least one second front speaker and the at least one first rear speaker form a second speaker arrangement for emitting multi-channel audio associated with the second wagering game in surround sound relative to a second player at the second gaming machine, the multi-channel audio including front audio emitted by the at least one second front speaker and rear audio emitted by the at least one first rear speaker.

20. The gaming system of claim 19, wherein the at least one first rear speaker extends from and above the first cabinet housing and the at least one second rear speaker extends from and above the second cabinet housing.

21. The gaming system of claim 19, wherein the at least one first rear speaker is symmetrically positioned relative to the at least one second rear speaker.

22. The gaming system of claim 19, wherein at least one of the first rear speaker and the second rear speaker is a wireless speaker.

23. The gaming system of claim 19, wherein at least one of the first rear speaker and the second rear speaker includes one or more of a left rear speaker, a right rear speaker, and a center rear speaker.

24. The gaming system of claim 19, further comprising one or more controllers coupled to the first gaming machine and the second gaming machine, at least one of the controllers being programmed to convert an audio signal from a non-surround sound signal to a surround sound signal before sending the audio signal to one or more of the first front speaker, the first rear speaker, the second front speaker, and the second rear speaker.

25. The gaming system of claim 24, wherein the non-surround sound signal includes one or more of a monophonic signal and a stereo signal.

* * * * *